United States Patent [19]

Marino

[11] Patent Number: 5,552,176
[45] Date of Patent: Sep. 3, 1996

[54] PET FOOD PREMIX PREPARATION

[75] Inventor: Richard P. Marino, Lakewood, Calif.

[73] Assignee: Scope Products, Inc., Tucson, Ariz.

[21] Appl. No.: 238,679

[22] Filed: May 5, 1994

[51] Int. Cl.$^6$ .............................. A23K 1/18; A23K 1/10
[52] U.S. Cl. ...................... 426/641; 426/635; 426/657; 426/805
[58] Field of Search .................................. 426/805, 641, 426/518, 520, 634, 656, 657, 574, 635

[56] References Cited

U.S. PATENT DOCUMENTS

| | | | |
|---|---|---|---|
| 3,447,929 | 6/1969 | Hale ........................................ | 426/805 |
| 3,984,576 | 10/1976 | Burkwall, Jr. et al. . | |
| 4,018,935 | 4/1977 | Catlin ...................................... | 426/646 |
| 4,020,187 | 4/1977 | McCulloch .............................. | 426/805 |
| 4,039,387 | 8/1977 | Weyn ...................................... | 426/62 |
| 4,039,689 | 8/1977 | Bone ........................................ | 426/99 |
| 4,055,681 | 10/1977 | Balaz et al. . | |
| 4,284,652 | 8/1981 | Christensen ............................. | 426/72 |
| 4,324,811 | 4/1982 | Eugley .................................... | 426/656 |
| 4,384,009 | 5/1983 | Lewis ...................................... | 426/646 |
| 4,568,550 | 2/1986 | Fulger et al. . | |
| 4,800,099 | 1/1989 | Gellman .................................. | 426/805 |
| 4,997,671 | 3/1991 | Spanier . | |
| 5,051,270 | 9/1991 | Ueda et al. ............................. | 426/574 |
| 5,087,473 | 2/1992 | Leo . . | |
| 5,141,755 | 8/1992 | Weisman . | |
| 5,281,432 | 1/1994 | Zallie et al. . | |
| 5,290,584 | 3/1994 | Ray ........................................ | 426/646 |
| 5,294,458 | 3/1994 | Fujimori ................................. | 426/635 |

OTHER PUBLICATIONS

American Meat Institute Foundation, *The Science of Meat and Meat Products*, W. H. Freeman and Company, (1960) pp. 402–412.

Dictionary of Nutrition and Food Technology, 6th Ed., Bender, Arnold E., Butterworth & Co. (Publishers) Ltd. (1990) pp. 177–178.

Webster's II New Riverside University Dictionary, Houghton Mifflin Co. (1984) p. 736.

*Primary Examiner*—Daniel J. Stemmer
*Attorney, Agent, or Firm*—Benman Collins & Sawyer

[57] ABSTRACT

A pet food premix product is provided, comprising a mixture of about 40 to 70 wt % of non-rendered meat and the balance at least one farinaceous and/or plant proteinaceous carrier substrate. One or more meats may be employed. A process is provided by which meat can be efficiently dehydrated and starch can be partially or completely gelatinized, then incorporated into an extruded dry or moist food at levels from 5 to 50% of a total formulation ration. The premix, when incorporated into an extruded pet food product, will increase its operational performance while delivering nutrients and palatability to the pet food product. In addition, a dried bakery product, is provided, which is useful as the farinaceous carrier substrate in the fabrication of the pet food premix product. The dried bakery product provides a naturally low pH pet food product having a pH in the range of about 5.7 to 6.4 and also unexpectedly provides an energy reduction in extrusion of pet food containing this ingredient.

20 Claims, No Drawings

PET FOOD PREMIX PREPARATION

BACKGROUND OF THE INVENTION

1. Field of the Invention

The present invention relates generally to pet foods, and, more particularly, to the preparation of a non-rendered pet food pre-mix product, useful for further processing by a pet food manufacturer. The present invention also relates to a carrier substrate comprising a dried bakery product as a filler in pet food and as an energy-reducing extrusion aid in the processing of pet food.

2. Description of Related Art

The pet food industry has utilized "meat"-based ingredients from its inception. The typical means by which meat is incorporated is in the form of rendered meals, raw meats, meat digests, drum-dried products, and spray-dried products. These meat products are sources from a variety of origins, including, but not limited to, beef, pork, poultry, fish, lamb, venison, horse, and the like that have been determined by the Association of Americal Feed Control Officials (AAFCO) as being of appropriate nutritional quality and functionality in a dry, canned, soft, moist, or treat product (such as biscuits, dry treats, jerky, and moist treats).

The use of meat(s) and their by-products and/or derivatives, has become an essential part of any pet food formulation. In dry pet food, for example, meat meal and poultry meal are widely used to provide palatability and as a source of protein. The advantages of utilizing these rendered products are that they are widely available at a reasonable cost to the manufacturer of the pet food, either dog or cat. In addition, digests which are enzymatically or acid hydrolyzed may be used to enhance the palatability and thus the acceptability to the pet of a given dry or moist pet food. However, as the pet food market has diversified, and through the demand of consumers that manufacturers provide higher quality products for their pets, a need has developed to explore new ingredients that meet nutritional, wholesome, and natural product requirements. Traditionally, meat meal or meat and bone meal and poultry meal or poultry by-product meal are rendered, with the main constituents being that of the offal, which by AAFCO's definition is the "material left behind as a by-product from the preparation of some specific product, less valuable portions, and the by-products of milling".

Thus, in the case of meat and poultry meals or by-product meals, offal would include the viscera, heads, feet, body carcasses, organs, condemned birds (whole chicken and turkey), and blood. The same principal would apply to fish, with the exception of salt, which should not exceed 3% at a maximum of 10% moisture. Fish processing also offers, as do other protein-based ingredients when wet-rendered, a soluble fraction which is obtained by the evaporation of the fish, with the oils part or not part of the soluble fraction which contains soluble protein from the starting material.

Therefore, in order to add, include, or formulate meat-based ingredients, they are typically added in a dry form for ease of handling at the factory level. The use of digests, solubles, or protein hydrolysates are an effective means by which pet acceptability to a product is obtained. However, the extensive uses of the by-products do cause concern to the consumer and have caused manufacturers to look at different ways to include whole meats without the use of the meat's offal in their products.

Typically, this is achieved by the addition of raw or cooked meat to the process, such as by extrusion, whereby the meat is processed under high pressure and temperature and is forced through a restricted orifice, resulting in a cooked gelatinized pet food product. There is much information on the art and technology of extrusion and its practice in both the pet food and food industries, and it is accordingly assumed that the general principals of extrusion are understood by the person skilled in this art.

The addition of raw or cooked meat products (meat, poultry, fish, and the like) to an extrusion system is achieved by pumping a slurry of the meat substrate, either in total or in a combination with other ingredients such as corn syrup, glycerin, propylene glycol, and the like, to complete the desired pet food type (i.e., soft, moist, or dry pet food). The addition of raw meat substrates may create an operational problem with the process due to microbiological concerns, physical space limitations due to plant process designs, and inconsistent pump performance due to viscosity changes, resulting in varied finished product chemistry (i.e., protein, fat, moisture, etc.), and can negatively affect the yield of a dry expanded pet food due to the decreased solids in the formula as a result of the meat addition. The preferred way of incorporating meat substrates to a product is in the dry state or meal form, such as with spray-dried or drum-dried meat products. The problem with directly adding these spray- or drum-dried meats is their cost due to the dehydration methods. Their quality is of good consistency and they are typically added to the surface of the product for palatability enhancement.

Thus, it is desired to provide an effective means by which a pet food manufacturer can add meat substrates to pet food products without having to add raw meat in order to achieve the desired label claim. It is further desired to provide an effective means for adding multiple meat sources at the same time without having to process each meat-based ingredient, with the associated problems described above. Finally, it is desired to offer pet food manufacturers the ability to increase the performance of their extrusion systems.

SUMMARY OF THE INVENTION

In accordance with the present invention, a pet food premix product is provided, comprising a mixture of about 40 to 70 wt % of non-rendered meat and the balance at least one farinaceous and/or plant proteinaceous carrier substrate.

The present invention also relates to a process by which meat can be efficiently dehydrated and starch can be partially or completely gelatinized, then incorporated into an extruded dry or moist pet food either at levels from 5 to 50% of a total formulation ration. The invention, when incorporated into an extruded pet food product, will increase its operational performance while delivering nutrients and palatability to the pet food product.

Specifically, the process of the present invention for preparing a pet food premix product for use by pet food manufacturers comprises:

(a) providing a source of meat selected from the group consisting of beef, horse, pork, lamb, poultry, fish, venison, offal thereof, and by-products thereof;

(b) providing a farinaceous and/or plant proteinaceous carrier substrate;

(c) mixing the meat and the carrier substrate to form a mixture comprising about 40 to 70 wt % meat and the balance the farinaceous carrier substrate;

(d) drying the mixture to dehydrate the mixture to a moisture level of less than about 10% to form a dried mixture; and (e) grinding and screening the dried mixture to form the pet food premix product.

Further, the invention provides a means of dehydrating multiple meat substrates, such as beef, chicken, fish, etc., in association with one or more farinaceous or proteinaceous ingredients as a carrier.

Also in accordance with the present invention, a process is provided for preparing a dried bakery product, which is useful as the farinaceous carrier substrate in the fabrication of the pet food premix product. The process for preparing the dried bakery product comprises:

(a) providing raw dough;

(b) providing baked dough;

(c) mixing the raw dough and the baked dough to form a mixture;

(d) drying the mixture to form a dried mixture; and (e) scalping and screening the dried mixture to form the dried bakery product.

The dried bakery product provides a naturally low pH pet food product having a pH in the range of about 5.7 to 6.4, and is effective in this regard by adding about 15 to 38 wt % of the dried bakery product to the final pet food product.

The dried bakery product provides a further benefit in the reduction of energy requirements for extruding pet food; adding about 15 to 38 wt % of the dried bakery product to the final pet food product is effective as an extrusion aid.

Finally, it is also the intention to illustrate the versatility of adding the dehydrated premix to the surface of a pet food product to aid in the enhancement of palatability.

DESCRIPTION OF THE PREFERRED EMBODIMENTS

The present invention relates to a non-rendering process that can dehydrate high levels of meat, fish, poultry, lamb, etc., while maintaining the nutritional and palatability characteristics that are inherent in these starting materials, but could be lost during a rendering process. The resultant dehydrated product is a clean, stable, high quality pet food ingredient.

In the process of the present invention, raw meat, meat offal, and other meat by-products, such as derived from any of the known animal meats (e.g., beef, horse, lamb, pork), fish, and poultry, are comminuted, or ground, and kept refrigerated to retard spoiling. As used hereinafter, the term "meat" is intended to encompass such known animal meats, including fish and poultry. The comminuted meat is placed in a mixer and blended with a carrier substrate. The carrier substrate comprises any of the known plant farinaceous and proteinaceous carriers, such as the flours of wheat, rice, oat, corn, and soy, the brans of wheat, rice, oat, and corn, wheat middlings, corn gluten meal, barley, whole ground wheat, whole ground corn, soybean meal, and the like. Further, up to about 2 wt % of the meat plus carrier substrate mixture may include one or more of the inorganic carriers commonly used in pet food preparation, such as silica, calcium carbonate, sodium bicarbonate, calcium citrate, and the like. Such inorganic carriers are used for water absorption (for high water-content meats) and/or for adjusting pH.

Preferably, the carrier substrate comprises a dried bakery product which comprises a dehydrated mixture of waste products from the bakery industry. The process for preparing the dried bakery product is described separately below.

The mixture comprises about 40 to 70 wt % meat and the balance (60 to 30 wt %) carrier. The particular ratio chosen depends on the density of the carrier. The lower the density, the higher the surface area, and thus the more water-absorbing quality possessed by the carrier.

Typically, the density of the carrier is in the range of about 30 to 45 lb/ft$^3$. For a carrier density of about 30 lb/ft$^3$, about 30 wt % of the carrier is employed; for a carrier density of about 45 lb/ft$^3$, about 60 wt % of the carrier is employed.

During mixing, the mixture tends to agglomerate into a dough-like consistency. Preferably, such a dough-like state is to be avoided; rather, a friable mixture, which permits ease of handling is desired. Agglomeration is avoided by not over-mixing the mixture. On the other hand, agglomeration can be broken up down-stream of the process, if necessary.

Mixing is done for about 3 to 6 minutes, preferably in a conventional, low shear, ribbon-type blender (for batch processing) or in a conventional twin paddle high speed blender (for continuous processing).

The mixture is next placed in a rotary dryer, operated at a temperature in the range of about 1,000° to 1,200° F., to dehydrate the mass. A high air flow, induced by either sucking or blowing air over the mixture, serves to maintain the temperature of the mixture to a maximum temperature in the range of about 165° to 195° F. as the product emerges from the dryer.

Specifically, the present invention represents an innovation with regard to an existing process whereby organic materials that are high in moisture (30 to 45% water-by-weight) are introduced to the rotating drum-drying system. The material enters the dryer in a "crumbled dough"-like state and is evenly dried to approximately 8 to 10% moisture. The dryer utilizes a gas burner that heats air that is either "blown" through the drying chamber, or is "vacuum-sucked" as the product travels through. The air moving at a very high velocity penetrates through the bed of material as it is conveyed in a calendaring fashion with the rotation of the drum.

The retention time in the dryer is predicated on the feed rate of the material, but is typically between 12 and 25 minutes; preferably between 18 to 22 minutes. As indicated above, the product exits the dryer at a temperature of 165° to 190° F.; preferably between 170° to 180° F.

The finished dried product is next ground through a 5/64 inch screen finer. It will be appreciated by those skilled in this art that it would not be easy to grind meat that has not been so treated, due to its fat content. However, the dehydrated product prepared by the process of the present invention, which has not been rendered, thereby retains all nutrients and fat, but in a state that is more readily handleable. In contrast, rendering, which is a high pressure, high temperature process, separates out both fat and moisture.

The ground, dried product is now in a state for further processing by a pet food manufacturer, who can use the product for incorporation into pet foods. The product is highly nutritious, and, by retaining its fat, is more palatable to pets.

The carrier employed in the process of the present invention provides two benefits. First, it acts as a carrier by which meat can be carried through the rotary dryer under relatively mild conditions. Second, the carrier absorbs fat, so that the fat is not rendered out of the meat.

The process of the present invention is not limited to matching a particular carrier to a particular meat. High protein meals, such as soybean meal, corn gluten meal, or bran substitute (rice bran, oat bran, oat groats, and the like), may be employed in whole or in part in formulating the carrier.

The final product may be stabilized with a conventional anti-oxidant to stabilize the fat. Examples of such anti-oxidants include BHA, BHT, ethoxyquin, mixed tocopherols (vitamin E), and the like. The resulting product is a stabilized, high protein meal, containing about 15 to 45% protein by weight and about 8 to 30% fat by weight.

The meal can be introduced into any type of pet food product, such as dried dog or cat food, soft moist dog or cat food, jerky-type dog food treat, dog biscuits, dry dog or cat snacks, and canned dog or cat food.

When the mixed and dried proteinaceous and farinaceous ingredients are added to an extrusion system, efficiency gains realized ranged from 16 to 30% depending on the level of the premix ingredients incorporated (i.e., 15 to 40% of the total pet food formulation) and the type of carrier. In this connection, the dried bakery product provides the highest efficiency gains, and is accordingly preferred as the carrier.

The following list is intended to illustrate, and not limit, the variety of combinations that could be incorporated into the dehydrated pet food premixes of the present invention that are further processed by pet food manufacturers into pet food products for sale to consumers:

A. Chicken-Based Premix:
whole chicken and whole ground wheat
whole chicken and wheat flour
whole chicken and bakery meal
whole chicken and corn gluten meal
whole chicken and soybean meal 48%
whole chicken and rice flour
whole chicken and corn flour
whole chicken and whole ground corn B. White Fish-Based Premix:
white fish and whole ground wheat
white fish and wheat flour
white fish and bakery meal
white fish and corn gluten meal
white fish and soybean meal 48%
white fish and rice flour
white fish and corn flour
white fish and whole ground corn C. Beef-Based Premix:
beef and whole ground wheat
beef and wheat flour
beef and bakery meal
beef and corn gluten meal
beef and soybean meal 48%
beef and rice flour
beef and corn flour
beef and whole ground corn D. Lamb-Based Premix:
lamb and whole ground wheat
lamb and wheat flour
lamb and bakery meal
lamb and corn gluten meal
lamb and soybean meal 48%
lamb and rice flour
lamb and corn flour
lamb and whole ground corn E. Mixed Meat-Based Premix:
chicken, lamb, and rice flour
chicken, fish, and rice flour
chicken, beef, fish, and rice flour
chicken, lamb, and wheat flour
chicken, fish and soybean meal
chicken, beef, fish, and corn gluten meal Dried Bakery Product The dried bakery product comprises a dehydrated mixture of waste products from the bakery industry, specifically, a mixture of raw dough (unprocessed) and baked dough (e.g., bread, cake, etc.). The product is about 85 to 90% gelatinized. The product is clean and stable, having been dried to a moisture of about 8 to 10%.

The dried bakery product is prepared in the same manner as the mixture of meat and carrier, namely, mixing the raw and baked dough, grinding, and drying in a rotary dryer. The conditions employed in that connection are used in this process as well. The drying reduces the moisture content from over 30% to less than 10%. The dried bakery product is then scalped and screened to a flour-like consistency. This step is to remove any paper, plastic, or other wrapping that have accompanied the product to this stage in the processing. While the product may be of a mealy consistency, the finer the consistency, the better.

In the dried, scalped state, it is then employed as a carrier in the preparation of the pet food product, as described above.

Use of the dried bakery product as a carrier is preferred for a number of reasons. First, it has a naturally low pH, due to fermentable products (yeasts). Typically, the pH of the dried bakery product ranges from about 4.5 to 5.5. When added to a pet food product in an amount ranging from about 15 to 38 wt % of the final product, the pH of the final product is in the range of about 5.7 to 6.4, with the higher concentration associated with the lower pH. A naturally low pH is good for felines, since a lower pH results in a lowering of the urine pH, which in turn helps reduce feline urinary syndrome (FUS).

On the other hand, the pH can be adjusted upward as necessary for use in dog food. In any event, the naturally lower pH reduces or eliminates the need to add phosphoric acid and/or other inorganic acids and/or organic acids to the pet food, which is often done to reduce pH. The reduction/elimination of phosphoric acid provides an additional benefit, since phosphoric acid competes for calcium, thus reducing its availability to the pet consuming the pet food.

Second, the dried bakery product unexpectedly confers a benefit in the extrusion of pet food, in that the dried bakery product, as processed in accordance with the invention, reduces the energy required for the extrusion process. This means that either the same through-put of product can be attained with lower energy, or an increased through-put can be attained with the same energy. The reduction in extrusion energy is on the order of 25 to 30%.

Summary

The present invention provides an effective means by which a pet food manufacturer can add meat substrates to their products without having to add raw meat in order to achieve the desired label claim. Also, the present invention allows for an effective means to add multiple meat sources at the same time without having to process each meat-based ingredient with the associated problems described above. The invention also offers pet food manufacturers with the ability to increase the performance of their extrusion systems by incorporating the present invention into their formulations.

The invention effectively dehydrates meat substrates on a carrier of a proteinaceous or farinaceous nature such as, but not limited to, wheat and wheat products, corn and corn products, rice and rice products, dehydrated bakery meal, corn gluten meal, soybean meal and soy (and its flour products, such as concentrates, isolates, etc.), barley and barley products, etc. This invention allows manufacturers of pet food to add key constituents to their formulations without having to inventory a multitude of ingredients for label declaration. For example, a popular pet food product utilizes chicken, lamb, and rice as its name and identifier. Typically, the manufacturer would have to add to the product a lamb meal, a chicken meal with rice or added raw chicken, or lamb directly to the cooker extruder. The present invention could solve this problem by providing a pre-mix of processed whole meat not rendered to the product with the rice as the carrier. The dehydration process of the present invention effectively dehydrates the chicken and lamb at once and gelatinizes the rice simultaneously.

This is a process benefit, as the extrusion system will not have to expend much energy (BTUs) into the processed pet food because both meat fraction and the starch fraction have effectively already been processed. The extruder will process primarily the ungelatinized starch fraction of a pet food formulation and result in a thoroughly, well-cooked, well-expanded pet food product. Efficiency gains realized utilizing this method with an extrusion process are recognized by the reduction in motor load or amperage. This enables the extruder to operate at higher capacities and closer to optimum fill for effective and efficient processing.

Further, the invention facilitates those formulations that are high energy-consuming, such as high protein formulation dog and cat foods, and allows these formulations to process at significantly higher extruder through-put rates than previously available.

EXAMPLES

Example 1

Based on the present invention, an investigation was made to introduce meat(s) to the dryer and establish the dryer's capability to dehydrate a high meat content matrix. The matrix consisted of whole ground chicken and wheat flour in a ratio of 60:40, respectively. The resultant chicken/wheat premix was introduced to the dryer at approximately 36% moisture and was then successfully dehydrated to a finished product moisture of 8.4%. The finished dried chicken/wheat combination was in a granular form for eventual ease of transportation and further processing.

It was determined that the resulting dried granular chicken/wheat mix could be re-introduced into the drying system to increase the level of meat in the product. A single pass-through the dryer would yield a finished product that would contain 37.5% chicken solids and 62.5% wheat solids, with a protein content between 15 and 24%, depending on the chicken substrate utilized.

Example 2

Depending on the application for pet food, the premix of chicken and wheat from Example 1 could be formulated into a dog or cat food at a concentration level between 5 and 50%, and preferably between 30 and 35%.

The following are two examples of the ingredient usage in a typical 21% protein dry dog food formula, the first being uncoated (Example 2A) and the second being coated (Example 2B):

| Example 2A Ingredients | % | Example 2B Ingredients | % |
| --- | --- | --- | --- |
| Chicken Premix | 38 | Chicken Premix | 36 |
| Poultry Meal | 18 | Poultry Meal | 18 |
| Wheat | 16 | Wheat | 16 |
| Rice | 15 | Rice | 15 |
| Beef Pulp | 5 | Beef Pulp | 5 |
| Fat | 7 | Fat | 0 |
| Vitamins | 0.3 | Vitamins | 0.3 |
| Minerals | 0.7 | Minerals | 0.7 |
| Total | 100 | Coating | |
|  |  | Chicken Premix | 2 |
|  |  | Fat | 7 |
|  |  | Total | 100 |

The above examples illustrate the versatility of the premix by its addition either internally or topically. This could not be done effectively with rendered meat or poultry-type products, which could cause salmonella. Plus, the advantage of the premix offers the pet food manufacturer the opportunity to add whole meats and not meat by-products into their pet foods. The further advantages are the process benefits to the extrusion system with its incorporation into the pet food ration.

The premixes of the present invention also offer significant process advantages to baked products as well. Because the product contains high levels of meat and the starch is pregelatinized, the die roll utilized to form the baked piece or biscuit facilitates release from the die, thus reducing the number of pieces or biscuits that remain in the die cavity and maximizing their release. Incorporation of the premix into baked products also provides nutritional value and palatability.

Further, the baking time may be reduced with its incorporation into a baked dog food formulation because the ingredient is precooked and the starch is gelatinized.

Example 3

A premix comprising whole ground chicken and wheat flour (50:50 wt ratio) having an initial moisture content of 32 wt % was formulated in accordance with the present invention under the following conditions:

| | |
| --- | --- |
| Dryer Temp. Entering: | 1,100–1,200° F. |
| Dryer Temp. Exiting: | 180°–190° F. |
| Dryer Retention Time: | 20–25 minutes |
| Final Moisture: | 8% |
| Screen Mesh Sizes: | |
| Hammermill (initial): | ⅜ inch |
| #5 Screen Final Grading: | 5/64 inch. |

Example 4

A premix comprising whole ground chicken and dried bakery product (60:40 wt ratio) having an initial moisture content of 36 wt % was formulated in accordance with the present invention under the following conditions:

| | |
| --- | --- |
| Dryer Temp. Entering: | 1,100°–1,200° F. |
| Dryer Temp. Exiting: | 180°–190° F. |
| Dryer Retention Time: | 20–25 minutes |
| Final Moisture: | 8.4% |
| Screen Mesh Sizes: | |
| Hammermill (initial): | ⅜ inch |
| #5 Screen Final Grading: | 5/64 inch. |

Example 5

The following formulations in which the premix of the present invention was incorporated were processed by extrusion. The concentration level of bakery product (as carrier in the premix) is shown in terms of the total formulation. The percent motor load of the extruder is shown, together with the dry feed rate. The results are listed in the Table below:

| Concentration | % Motor Load | Dry Feed Rate |
|---|---|---|
| I. Dog Food Formulations with bakery product: | | |
| 24.06% | 30 | 750 lbs/hr |
| 30.75% | 28 | 750 lbs/hr |
| 38.05% | 26 | 750 lbs/hr |
| II. Cat Food Formulations with bakery product: | | |
| 14.25% | 39 | 750 lbs/hr |
| 26.65% | 27 | 750 lbs/hr |
| 29.41% | 26 | 750 lbs/hr |
| III. Cat Food Formulations with bakery product: | | |
| 0% | 40 | 685 lbs/hr |
| 10.65% | 33 | 685 lbs/hr |

It is assumed that 100% motor load is the maximum capability of the motor itself. As shown in this Table, the use of bakery product reduces motor load and allows for added extruder capacity.

Thus, there has been disclosed a pet food product and a dried bakery product useful in preparing the pet food product. It will be apparent to those skilled in this art that various changes and modifications of an obvious nature may be made, and all such changes and modifications are considered to fall within the scope of the invention, as defined by the appended claims.

What is claimed is:

1. A process for preparing a pet food premix product for use by pet food manufacturers comprising:

(a) providing at least one source of meat selected from the group consisting of beef, horse, pork, lamb, poultry, fish, venison, offal thereof, and by-products thereof;

(b) providing at least one career substrate selected from the group consisting of farinaceous and plant proteinaceous carriers;

(c) mixing said at least one source of meat and said at least one carrier substrate to form a mixture, said mixture comprising about 40 to 70 wt % of at least one source of meat and about 30 to 60 wt % of at least one carrier substrate, wherein said at least one source of meat and said at least one carrier substrate are employed in said mixture at a ratio that is determined based upon the density of said at least one carrier substrate, with a lower carrier substrate density corresponding to a lower amount of carrier substrate in the ratio;

(d) drying said mixture in a dryer to dehydrate said mixture to a moisture level of less than about 10% to form a dried mixture; and (e) grinding and screening said dried mixture to form said pet food premix product.

2. The process of claim 1 wherein said at least one carrier substrate is selected from the group consisting of dried bakery product, wheat flour, wheat middlings, wheat bran, whole ground wheat, rice flour, rice bran, oat flour, oat bran, corn flour, corn bran, corn gluten meal, whole ground corn, soy flour, soybean meal, and barley.

3. The process of claim 2 wherein said dried bakery product is prepared by a process comprising:

(a) providing raw dough;

(b) providing baked dough;

(c) mixing said raw dough and said baked dough to form a mixture;

(d) drying said mixture in a dryer to form a dried mixture; and (e) scalping and screening said dried mixture to form said dried bakery product.

4. The process of claim 3 wherein said dryer comprises a rotary dryer maintained at a temperature of about 1,000° to 1,200° F. and wherein said mixture has a temperature of about 165° to 190° F. as it emerges from said dryer.

5. The process of claim 3 wherein said mixture spends about 12 to 25 minutes in said dryer.

6. The process of claim 1 wherein said carrier substrate density ranges from about 30 to 45 lbs/ft$^3$.

7. The process of claim 1 further comprising adding to said mixture up to about 2 wt % of at least one inorganic carrier selected from the group consisting of silica, calcium carbonate, sodium bicarbonate, and calcium citrate.

8. The process of claim 1 wherein said at least one source of meat and said at least one carrier substrate are blended at a blender speed for about 3 to 6 minutes.

9. The process of claim 1 wherein said dryer comprises a rotary dryer maintained at a temperature of about 1,000° to 1,200° F. and wherein said mixture has a temperature of about 165° to 190° F. as it emerges from said dryer.

10. The process of claim 9 wherein said mixture spends about 12 to 25 minutes in said dryer.

11. The process of claim 1 wherein said dried mixture is screened to a size of 5/64 inch or less.

12. The process of claim 1 wherein said pet food premix product has a protein content of about 15 to 45 wt % and a fat content of about 8 to 30 wt %.

13. The process of claim 1 wherein said mixing and said drying avoid rendering said meat.

14. A process for preparing a pet food premix product for use by pet food manufacturers comprising:

(a) providing at least one source of meat selected from the group consisting of beef, horse, pork, lamb, poultry, fish, venison, offal thereof, and by-products thereof;

(b) providing a carrier substrate comprising dried bakery product, said dried bakery product prepared by a process comprising:

(i) providing raw dough, (ii) providing baked dough, (iii) mixing said raw dough and said baked dough to form a mixture, (iv) drying said mixture in a dryer to form a dried mixture, and (v) scalping and screening said dried mixture to form said dried bakery product;

(c) mixing said at least one source of meat and said carrier substrate to form a mixture, said mixture comprising about 40 to 70 wt % of at least one source of meat and about 30 to 60 wt % of said carrier substrate;

(d) drying said mixture in a dryer to dehydrate said mixture to a moisture level of less than about 10% to form a dried mixture; and (e) grinding and screening said dried mixture to form said pet food premix product.

15. The process of claim 14 wherein said dryer comprises a rotary dryer maintained at a temperature of about 1,000° F. to 1,200° F. and wherein said mixture has a temperature of about 165° F. to 190° F. as it emerges from said dryer.

16. The process of claim 14 wherein said mixture spends about 12 to 25 minutes in said dryer.

17. The process of claim 14 further comprising adding to said mixture up to about 2 wt % of at least one inorganic carrier selected from the group consisting of silica, calcium carbonate, sodium bicarbonate, and calcium citrate.

18. The process of claim 14 wherein said meat and said carrier substrate are blended at a blender speed for about 3 to 6 minutes.

19. The process of claim 14 wherein said dried mixture is screened to a size of $5/64$ inch or less.

20. The process of claim 14 wherein said pet food product has a protein content of about 15 to 45 wt % and a fat content of about 8 to 30 wt %.

* * * * *